(12) United States Patent
Sköld et al.

(10) Patent No.: US 10,516,510 B2
(45) Date of Patent: Dec. 24, 2019

(54) METHOD AND APPARATUS FOR WIRELESS COMMUNICATION

(71) Applicant: Telefonaktiebolaget LM Ericsson (publ), Stockholm (SE)

(72) Inventors: Johan Sköld, Solna (SE); Robert Baldemair, Solna (SE); Håkan Björkegren, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 189 days.

(21) Appl. No.: 15/316,204

(22) PCT Filed: Oct. 19, 2016

(86) PCT No.: PCT/SE2016/051017
§ 371 (c)(1),
(2) Date: Dec. 5, 2016

(87) PCT Pub. No.: WO2017/082795
PCT Pub. Date: May 18, 2017

(65) Prior Publication Data
US 2017/0272213 A1    Sep. 21, 2017

Related U.S. Application Data

(60) Provisional application No. 62/253,901, filed on Nov. 11, 2015.

(51) Int. Cl.
*H04W 4/00* (2018.01)
*H04L 5/00* (2006.01)
(Continued)

(52) U.S. Cl.
CPC .............. *H04L 5/001* (2013.01); *H04L 5/003* (2013.01); *H04L 5/0007* (2013.01);
(Continued)

(58) Field of Classification Search
CPC . H04L 27/2602; H04L 27/2634; H04L 5/001; H04L 5/0007; H04L 5/0041;
(Continued)

(56) References Cited

U.S. PATENT DOCUMENTS

2008/0240275 A1* 10/2008 Cai .................. H04L 5/0007
375/260
2009/0116435 A1* 5/2009 Koorapaty ............ H04L 5/0007
370/329

(Continued)

FOREIGN PATENT DOCUMENTS

RU           2507719 C2      2/2014
WO        2008118429 A1     10/2008
(Continued)

OTHER PUBLICATIONS

3GPP, "3rd Generation Partnership Project; Technical Specification Group Radio Access Network; Evolved Universal Terrestrial Radio Access (E-UTRA); Base Station (BS) radio transmission and reception (Release 13)", 3GPP TS 36.104 V13.1.0 (Sep. 2015), Sep. 2015, 1-156.

(Continued)

*Primary Examiner* — Bob A Phunkulh
(74) *Attorney, Agent, or Firm* — Murphy, Bilak & Homiller, PLLC

(57) ABSTRACT

Teachings herein improve the choice of carrier placement in a wireless communication network by de-coupling the carrier raster from the subcarrier grid. Recognizing that the placement of a carrier by its center frequency is an artificial construct, it is re-defined and the carrier placement is instead defined by the carrier position, which is on a carrier raster (e.g., 100 kHz), but in general does not have to be the center of the carrier. Second, a subcarrier grid is defined that is common for all RF carriers and spanning a range of frequencies, at least within an operating band, and provides (Continued)

orthogonality for subcarriers within all RF carriers regardless of carrier position. Third, a unique mapping from the carrier position on the RF carrier raster to a subcarrier reference position, e.g., the DC subcarrier, is defined, which in turn identifies the exact position of the RF carrier on the subcarrier grid.

42 Claims, 10 Drawing Sheets

(51) Int. Cl.
　　 H04L 27/26　　(2006.01)
　　 H04W 72/04　　(2009.01)
　　 H04W 88/08　　(2009.01)
(52) U.S. Cl.
　　 CPC ...... H04L 27/2602 (2013.01); H04L 27/2634 (2013.01); H04W 72/0406 (2013.01); H04W 72/0453 (2013.01); H04W 88/08 (2013.01)
(58) Field of Classification Search
　　 CPC ... H04L 5/0092; H04L 5/0053; H04L 5/0048; H04L 5/0037; H04L 27/2655; H04L 5/0094; H04L 2027/0026; H04L 2027/0083; H04L 27/2657; H04W 72/0406; H04W 72/0453; H04W 88/08; H04W 72/044; H04W 88/02; H04B 1/0071; H04B 1/0075
　　 See application file for complete search history.

(56) References Cited

U.S. PATENT DOCUMENTS

| | | | | |
|---|---|---|---|---|
| 2010/0027492 A1* | 2/2010 | Asanuma | ............ | H04L 5/0007 370/329 |
| 2010/0080308 A1* | 4/2010 | Yin | ............ | H04L 5/0007 375/260 |
| 2010/0086065 A1* | 4/2010 | Higuchi | ............ | H04L 5/0037 375/260 |
| 2011/0041027 A1* | 2/2011 | Fong | ............ | H04L 1/1812 714/749 |
| 2011/0182332 A1* | 7/2011 | Ericson | ............ | H04L 5/0044 375/219 |
| 2011/0211489 A1* | 9/2011 | Chung | ............ | H04L 5/001 370/252 |
| 2011/0317647 A1* | 12/2011 | Cho | ............ | H04L 5/0007 370/329 |
| 2012/0224552 A1* | 9/2012 | Feuersanger | ............ | H04L 5/0007 370/329 |
| 2013/0188756 A1* | 7/2013 | Sundstrom | ............ | H04L 5/001 375/319 |
| 2013/0343261 A1* | 12/2013 | Gonsa | ............ | H04B 7/2606 370/315 |
| 2015/0189518 A1* | 7/2015 | Faerber | ............ | H04W 24/02 455/450 |
| 2016/0057708 A1* | 2/2016 | Siomina | ............ | H04W 52/243 455/452.2 |
| 2016/0072614 A1* | 3/2016 | Blankenship | ............ | H04W 4/70 370/329 |
| 2017/0272213 A1* | 9/2017 | Skold | ............ | H04L 5/001 |

FOREIGN PATENT DOCUMENTS

WO　　2009152177　A2　　12/2009
WO　　2009152657　A1　　12/2009

OTHER PUBLICATIONS

3GPP, "3rd Generation Partnership Project; Technical Specification Group Radio Access Network; Evolved Universal Terrestrial Radio Access (E-UTRA); User Equipment (UE) radio transmission and reception (Release 13)", 3GPP TS 36.101 V13.1.0 (Oct. 2015), Oct. 2015, 1-762.

3GPP, "3rd Generation Partnership Project; Technical Specification Group Radio Access Network; Evolved Universal Terrestrial Radio Access (E-UTRA); Base Station (BS) radio transmission and reception (Release 12)", 3GPP TS 36.104 V12.9.0 (Sep. 2015), Sep. 2015, 25-27.

3GPP, "3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.9.0 (Oct. 2015), Oct. 2015, 36-37.

* cited by examiner

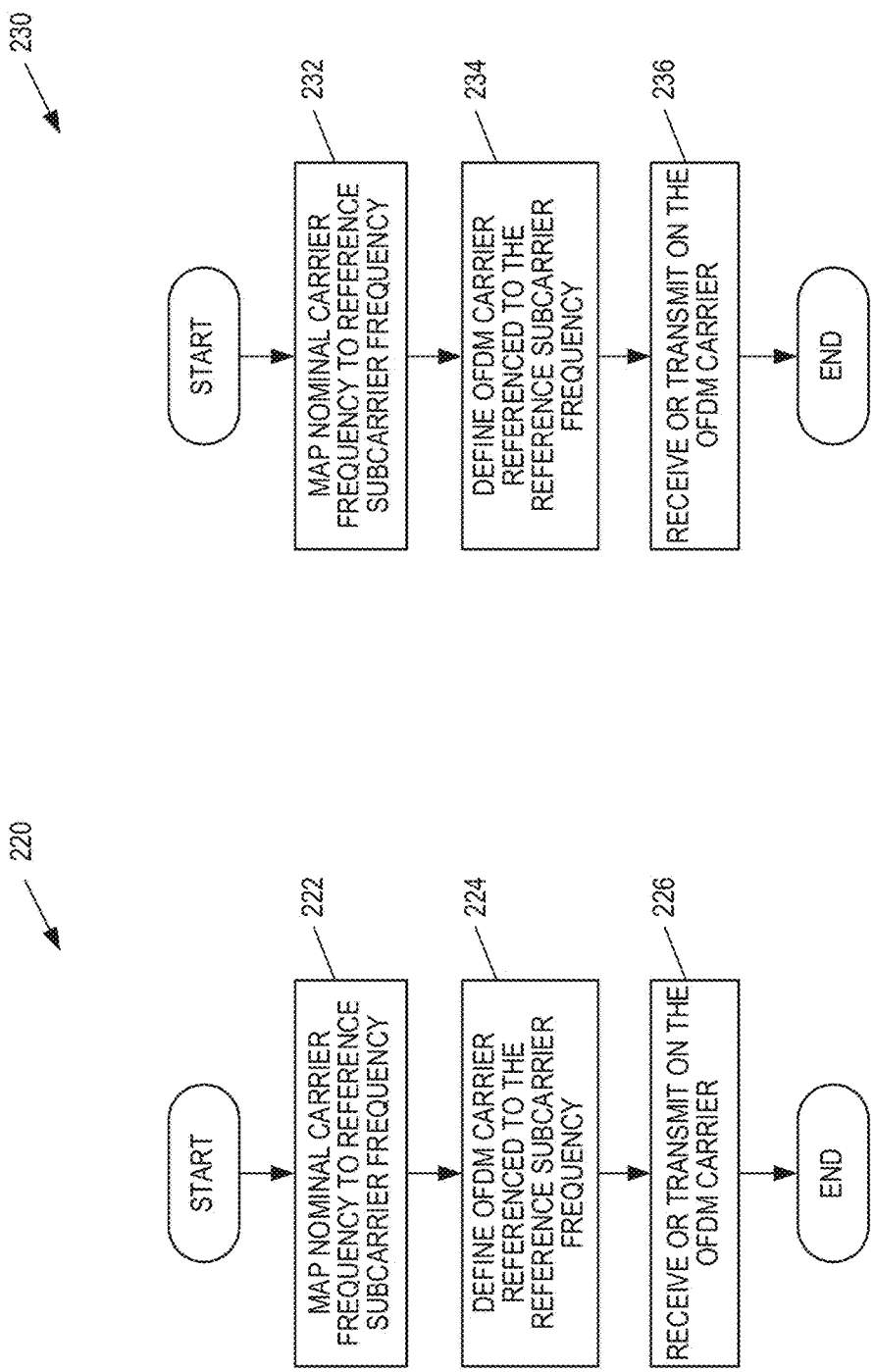

METHOD AND APPARATUS FOR WIRELESS COMMUNICATION

TECHNICAL FIELD

The present invention relates to wireless communication networks, and particularly relates to aligning carriers to defined subcarrier frequency grids.

BACKGROUND

A wireless communication network includes at least one Radio Access Network (RAN), which establishes wireless communications between a fixed network node (known as a base station, NodeB, or eNodeB) and a plurality of possibly mobile wireless devices, which may for example comprise machine-type communication (MTC) devices, machine-to-machine (M2M) devices, or user communication terminals, also known as User Equipments or UEs. For the simplicity of explanation and without loss of generality, the RAN is described herein in the context of an eNodeB communicating with UEs, although, of course, other types of devices are in fact included.

The RAN implements these communication links by modulating information onto a Radio Frequency (RF) carrier signal, referred to as a "carrier" or "component carrier." Network operators license frequency spectra from regulatory bodies, and operate RANs within specific frequency bands over certain geographic areas (cells). Within each band, a carrier raster having a predetermined frequency spacing is defined; RF carriers for uplink and downlink communications are confined to frequencies on this grid. Within each band, a limited number of carriers are operated, to facilitate efficient cell search by UEs.

When a UE first connects to a network, it does not have knowledge of the frequencies of the downlink RF carrier(s) transmitted by the network. The UE performs a cell search by scanning the possible RF carrier positions (that is, the frequency positions on the carrier raster) and tries to identify and synchmnize to any available downlink carriers. Once connected to a network, cell search also must be performed periodically by the UE to provide mobility, since it needs to find and identify adjacent candidate cells for handover. The larger the number of possible carrier positions, the longer the time cell search will take. For this reason, the number of carrier positions in the carrier raster is limited.

As an example, the LTE RAN (also called E-UTRA) has a carrier raster within each operating band, with a 100 kHz spacing between possible carrier frequency positions (f), as depicted in FIG. 1. See also 3GPP TS 36.101 and TS 36.104, the disclosures of which are incorporated herein by reference in their entireties. This 100 kHz grid gives a reasonable number of points on which to search, and in addition matches the block assignment of spectrum licenses awarded to operators, which very often has a granularity of 100 kHz.

The E-UTRA utilizes Orthogonal Frequency Division Multiplexing (OFDM) in the downlink, and OFDM precoded by a Discrete Fourier Transform (DFT) in the uplink. For the purposes of this disclosure, the uplink may also be considered to be OFDM. OFDM is characterized by the transmission of a large number of relatively narrowband subcarriers, which are mutually orthogonal. The overall set of subcarriers is referred to as a "carrier" and the mutual orthogonality means that ideally the subcarriers do not cause interference to each other after demodulation. Another property of OFDM is that it is possible to use a computationally efficient Fast Fourier Transform processing for the receiver and correspondingly an Inverse FFT (IFFT) for the transmitter.

FIG. 2 depicts a representative frequency-domain structure for an LTE system, where the subcarriers are spaced 15 kHz apart. By convention, the frequency of a carrier or subcarrier is its center frequency. In the downlink, the set of subcarriers is centered on the downlink carrier frequency. The center subcarrier is typically unused, to avoid interference from e.g. the Local Oscillator at the DC frequency in the receiver. This subcarrier is thus referred to as the DC subcarrier. In the uplink, the carrier is centered between the two center-most subcarriers. The uplink is usually an even number of subcarriers due to the use of an even FFT size in the UE.

The demand for higher peak data rates and overall throughput continues to increase as wireless networks and UE devices become more sophisticated, and users desire to access more content and services. One way to support this is to use RF carriers having a larger bandwidth. For OFDM using the same subcarrier definition, this means more subcarriers and unpractically large FFTs. An alternative approach to achieving a more wideband signal is to use multiple component carriers that am aggregated and jointly used for communication. This technique is called carrier aggregation.

FIG. 3 depicts an example of carrier aggregation. All component carriers must be placed on the same 100 kHz grid, in order for UEs to be able to use cell search procedures to synchronize to the download carriers, for both initial access and handover. An additional restriction on the carrier spacing is that it must be a multiple of the subcarrier spacing (15 kHz in the LTE example), because the transmitter and receiver should be able to use the same FFT for the aggregated carriers, and to maintain orthogonally between the subcarriers of the two component carriers.

Hence, the component carrier spacing must be a multiple of both the carrier raster spacing (100 kHz) and the subcarrier spacing (15 kHz). In the LTE example, this leads to a carrier spacing which must be a multiple of 300 kHz, which is the lowest common multiple of the carrier raster spacing and the subcarrier grid spacing. The reduced freedom of selecting the component carrier placement results in an unused, and hence undesirable, gap between the component carriers, shown as reserved subcarriers in FIG. 3.

This restriction of RF carrier placement—that the RF carrier center must be on the carrier raster and also to have the subcarriers between component carriers aligned—raises several issues. For a system such as LTE that uses carrier aggregation, there will be a severe limitation on the location of the RF carriers, since both carriers' center frequencies must be on both the RF carrier raster and a common subcarrier spacing.

When designing a system and selecting the RF parameters, these limitations also restrict the choice of the subcarrier spacing. The subcarrier spacing cannot be selected to give a too large "lowest common multiple," since that would severely restrict the placement of the component carriers.

The Background section of this document is provided to place embodiments of the present invention in technological and operational context, to assist those of skill in the art in understanding their scope and utility. Approaches descried in the Background section could be pursued but are not necessarily approaches that have been previously conceived or pursued. Unless explicitly identified as such, no statement herein is admitted to be prior art merely by its inclusion in the Background section.

SUMMARY

The following presents a simplified summary of the disclosure to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, the choice of carrier placement is improved by de-coupling the carrier raster from the subcarrier grid. First, noting that denoting the placement of a carrier by its center frequency is an artificial construct, it is re-defined and the carrier placement is instead defined by the carrier position, which is on a carrier raster (e.g., 100 kHz), but in general does not have to be the center of the carrier. Second, a subcarrier grid (or grids) is defined, that is common for all RF carriers and spanning a range of frequencies (at least within an operating band), providing orthogonality for subcarriers within all RF carriers regardless of carrier position. Third, a unique mapping from the carrier position (on the RF carrier raster) to a subcarrier reference position (e.g., DC subcarrier) is defined, which in turn identifies the exact position of the RF carrier on the subcarrier grid. The defined subcarrier reference position, in general, does not have to be on a DC subcarrier or any "center subcarrier(s)" of the RF carrier, but it must be a pre-determined reference point that identifies the placement of the RF carrier on the subcarrier grid.

One embodiment relates to a method of defining a component carrier in a wireless communication network. A carrier position is defined as a frequency on a carrier raster of predetermined frequency spacing, wherein the carrier position does not necessarily correspond to the center of the carrier. A subcarrier grid comprising a predetermined subcarrier frequency spacing, a starting frequency, and the relationship of other subcarriers in the raster to the reference position is defined. The RF carrier consists of a set of subcarriers placed on the subcarrier grid, where the placement of the set of subcarriers is defined by a reference point. The carrier position is uniquely mapped to the reference point. In the case of carrier aggregation, the minimum distance between two component carrier positions is not limited to the least common multiple of carrier raster frequency spacing and subcarrier frequency spacing.

Another embodiment relates to a method of cell search in a wireless communication network. A frequency number $N_{DL}$ is obtained. Based on the frequency number $N_{DL}$, a carrier position $F_P$ is calculated. The carrier position $F_P$ is mapped to a reference subcarrier frequency $f_{SC0}$. Signals are transmitted or received on subcarriers associated with the reference subcarrier frequency.

Yet another embodiment relates to a network node operative in a wireless communication network. The node is, for example, a radio base station, and includes processing circuitry operatively connected to transceiver circuitry. The processing circuitry is operative to define a carrier position as a frequency on a carrier raster of predetermined frequency spacing; define a subcarrier grid comprising a predetermined subcarrier frequency spacing, a reference subcarrier frequency, and the relationship of other subcarriers in the raster to the reference position; and uniquely map the carrier position to the reference subcarrier frequency. When so defined, the minimum distance between two component carrier positions is not limited to the least common multiple of carrier raster frequency spacing and subcarrier frequency spacing.

In an example implementation, the processing circuitry of the base station or other network node is configured to map a nominal carrier frequency to a reference subcarrier frequency according to a mapping function. The nominal carrier frequency is among a plurality of nominal carrier frequencies defined by a carrier frequency raster that defines nominal carrier frequency positions within a frequency band of interest. The mapping function uniquely maps each nominal carrier frequency to a corresponding reference subcarrier frequency on a subcarrier frequency grid that defines permissible subcarrier frequency positions within the frequency band. The processing circuitry is configured further to define an Orthogonal Frequency Division Multiplex (OFDM) carrier referenced to the reference subcarrier frequency and comprising a set of subcarriers at respective ones of the permissible subcarrier frequency positions, as defined by the subcarrier frequency grid, and receive or transmit on the OFDM carrier.

Still another embodiment relates to a User Equipment (UE) operative in a wireless communication network. The UE includes a processing circuitry operatively connected to transceiver circuitry. The processing circuitry is operative to obtain a frequency number $N_{DL}$; calculate a carrier position $F_P$ based on the frequency number $N_{DL}$; map the carrier position Fr to a reference subcarrier frequency $f_{SC0}$; and transmit or receive signals on subcarriers associated with the reference subcarrier frequency.

In an example implementation, the processing circuitry of the UE is configured to map a nominal carrier frequency to a reference subcarrier frequency according to a mapping function. The nominal carrier frequency is among a plurality of nominal carrier frequencies defined by a carrier frequency raster that defines nominal carrier frequency positions within a frequency band of interest, and the mapping function uniquely maps each nominal carrier frequency to a corresponding reference subcarrier frequency on a subcarrier frequency grid that defines permissible subcarrier frequency positions within the frequency band. The processing circuitry of the UE is configured further to define an OFDM carrier referenced to the reference subcarrier frequency and comprising a set of subcarriers at respective ones of the permissible subcarrier frequency positions, as defined by the subcarrier frequency grid, and receive or transmit on the OFDM carrier.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 11 is a logic flow diagram of one embodiment of a method implemented in a radio base station, such as an eNodeB.

FIG. 12 is a logic flow diagram of one embodiment of a method implemented in a wireless communication device, such as a UE.

DETAILED DESCRIPTION

For simplicity and illustrative purposes, the present invention is described by referring mainly to an exemplary embodiment thereof. In the following description, numerous specific details are set forth to provide a thorough understanding of the present invention. However, it will be readily apparent to one of ordinary skill in the art that the present invention may be practiced without limitation to these specific details. In this description, well-known methods and structures have not been described in detail so as not to unnecessarily obscure the present invention.

In particular, embodiments of the invention are described in the context of downlink transmissions in LTE employing carrier aggregation. The invention, however, is not limited to this context, but also finds application in the uplink, and in other wireless network protocols that employ OFDM or variants thereof as well as other multi-carrier transmission schemes. Without implying limitation to such examples, the teachings herein apply to wireless communication systems based on OFDM, Discrete Fourier Transform Spread, DFTS, OFDM, multi-carrier, and precoded multi-carrier.

Embodiments of the present invention relate the placement of an RF component carrier to an array of subcarriers. The structure, arrangement, spacing and the like of the subcarriers is referred to herein as a subcarrier grid. A defined subcarrier grid may be the same for all component carriers, at least throughout an operating frequency band, to preserve orthogonality of the subcarriers between different component carriers. Alternatively, more than one subcarrier grid may be defined. By de-coupling the RF carrier placement from the subcarrier grid, greater flexibility and more efficient use of spectrum is achieved, as compared to the restrained RF carrier placement of the prior art.

A parameter defining the carrier placement on the carrier raster is the carrier position frequency $F_P$. The carrier position $F_P$ is always on one of the carrier raster points, thus corresponding to a frequency number $N_{DL}$ within an operating band. These predefined frequency positions may be termed "nominal carrier positions". The mapping from the frequency number $N_{DL}$ to the nominal carrier position frequency Fr on the carrier raster is given by:

$$F_P = F_{DL\_LOW} + \Delta F \cdot (N_{DL} - N_{offset\_DL})$$

where $F_{DL\_LOW}$, $N_{offset\_DL}$, and $\Delta F$ are operating band specific parameters that define the RF carrier raster within an operating band. In particular, $F_{DL\_LOW}$ defines the starting point of the carrier raster. $N_{offset\_DL}$ sets the frequency number of the starting point, and $\Delta F$ is the carrier raster spacing, or granularity.

Figure 1:
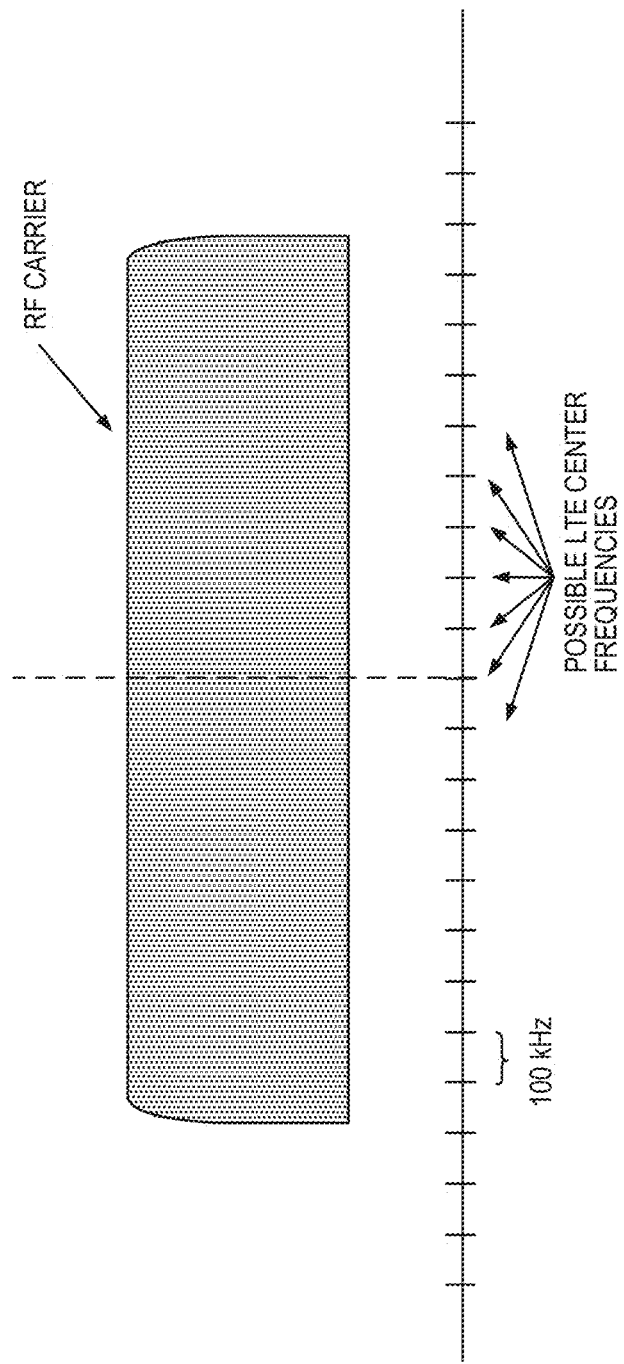
FIG. 1 is a frequency diagram of a wideband RF carrier signal.
Figure 2:
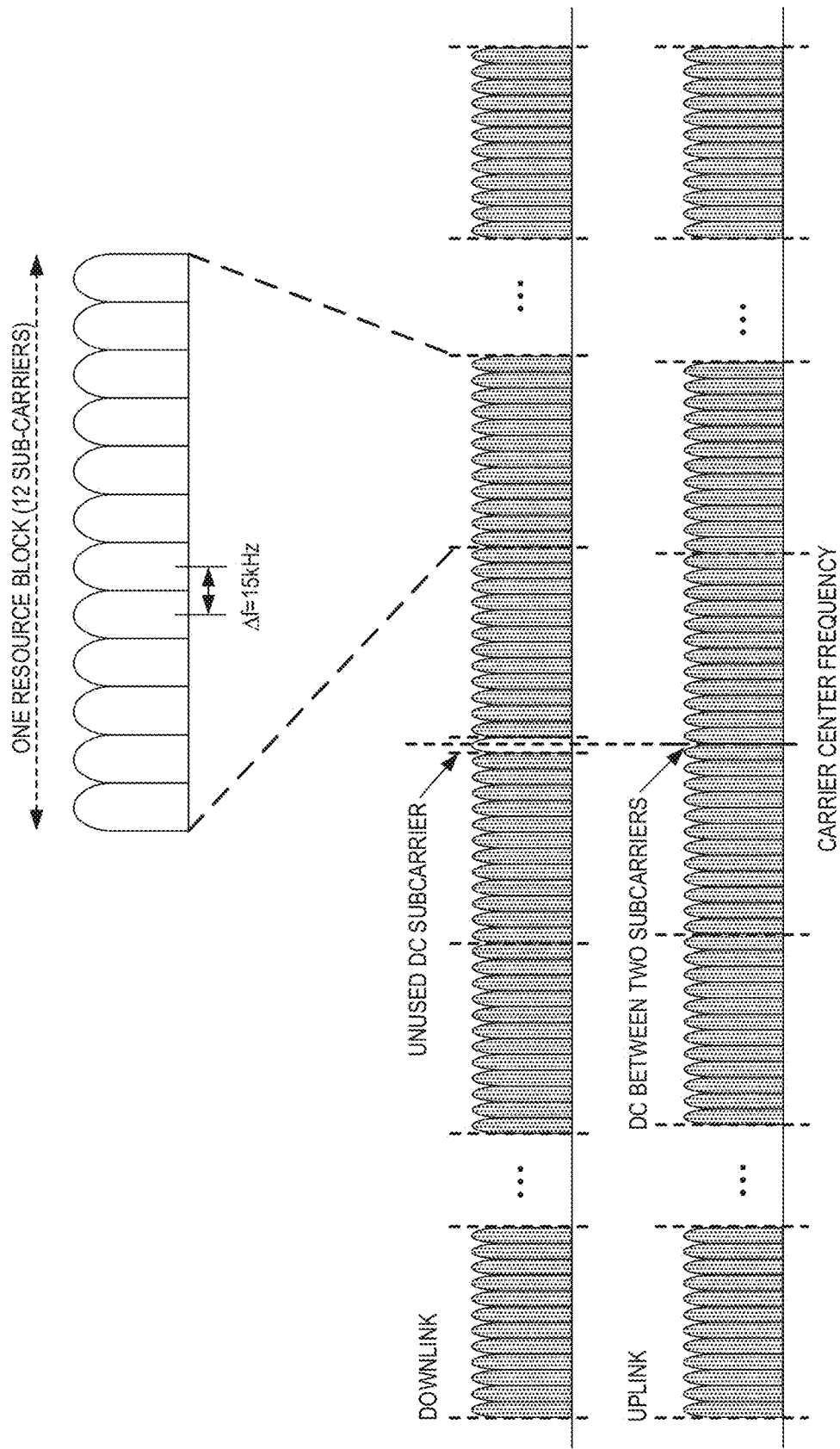
FIG. 2 is a frequency diagram of the relationship between carrier frequency and subcarriers for LTE uplink and downlink transmissions.
Figure 3:
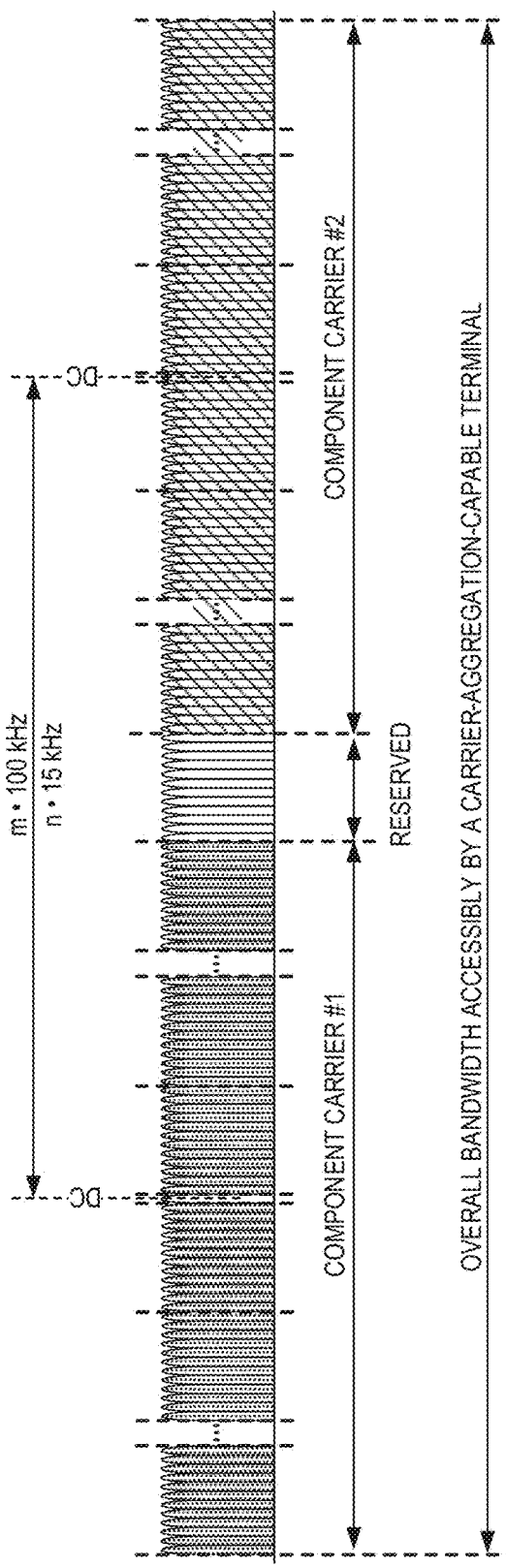
FIG. 3 is a frequency diagram showing reserved (unused) subcarriers between component carriers whose placement is confined to grid positions satisfying the least common multiple between carrier raster and subcarrier spacing.

Another parameter defining the carrier placement is a reference subcarrier frequency $f_{SC0}$ on a subcarrier grid. In one downlink example, this can be the DC subcarrier frequency. Note that the reference subcarrier frequency is a single frequency value. This value may be between two subcarriers, as depicted in the uplink example of FIG. 2, or may be centered on a subcarrier, as depicted in the downlink example of FIG. 2. As used herein, when the reference subcarrier frequency is equated to a subcarrier, it is assumed to be the frequency value of the center of that subcarrier. The reference subcarrier frequency $f_{SC0}$ serves as a reference point for all subcarriers in an RF carrier. In one embodiment, the reference subcarrier frequency $f_{SC0}$ defines the position of the DC subcarrier.

The full grid of subcarrier frequencies is defined by:

$$f_{SC} = f_{offset} + \Delta f (u_{SC} - u_{offset})$$

where $f_{offset}$, $\Delta f$, and $u_{offset}$ are parameters that define the subcarrier grid. These values may be universal throughout a RAN, or may be specific to an operating band, a group of operating bands, or a frequency range. Multiple subcarrier grids may also cover the same frequency range(s). The parameter $f_{offset}$ defines the starting point of the subcarrier grid, $u_{offset}$ sets the subcarrier number of the starting point, and $\Delta f$ is the subcarrier spacing.

Figure 4:
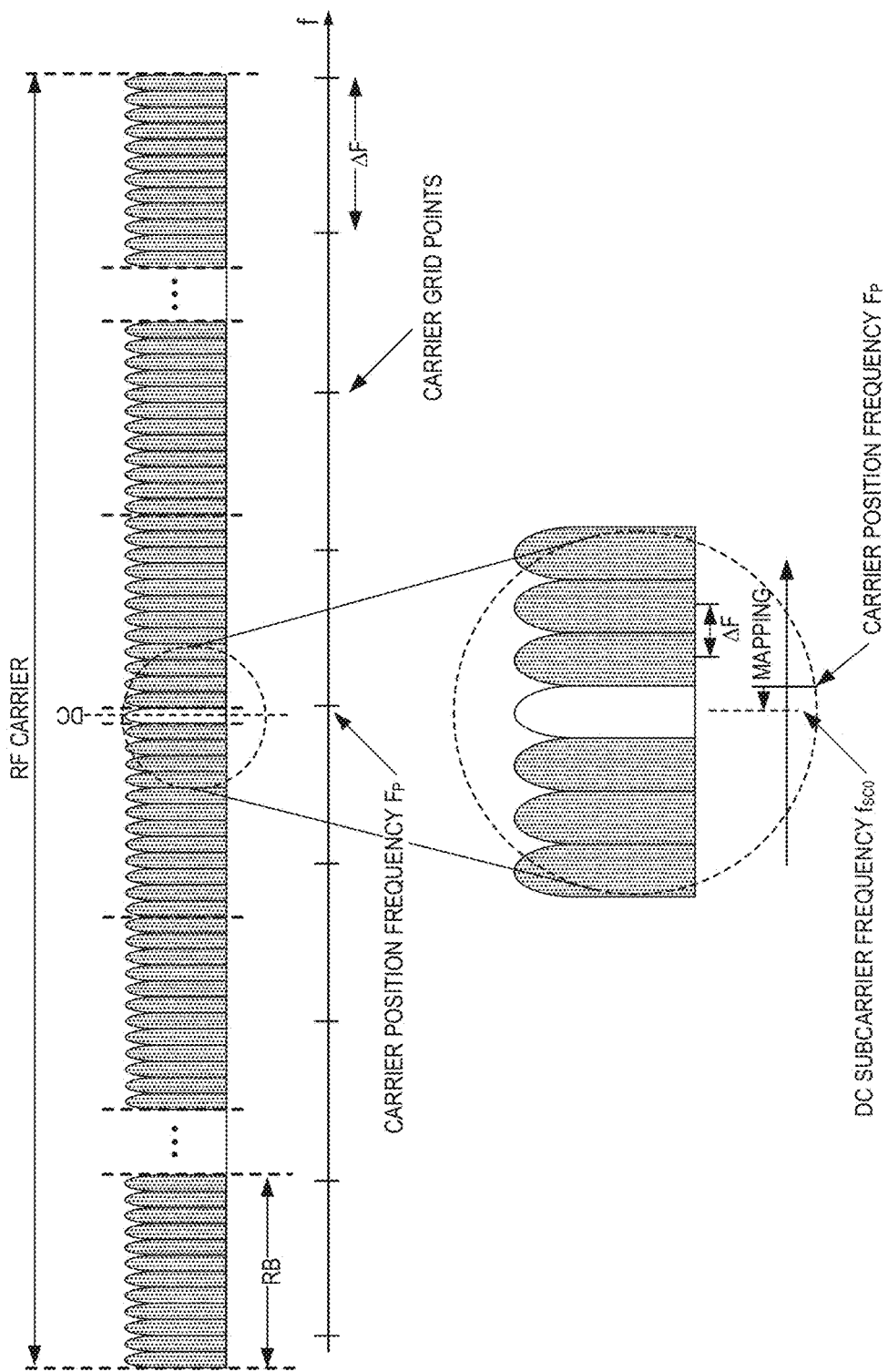
FIG. 4 is a frequency diagram depicting one mapping of carrier position to subcarrier reference position, being the DC subcarrier frequency.

According to embodiments of the present invention, a unique mapping is defined between the RF carrier position $F_P$ and the reference subcarrier frequency $f_{SC0}$ (e.g., the DC subcarrier). The offset between a nominal carrier position or frequency $F_P$ and $f_{SC0}$ is not necessarily constant and can sometimes even be zero. In one embodiment, depicted in FIG. 4, this mapping is the "floor" function (assuming $f_{offset} = 0$ Hz and $u_{offset} = 0$). This function is defined as floor (x) = the largest integer not greater than x. The mapping in this embodiment is thus:

$$f_{SC0} = \Delta f \cdot \text{floor}\left(\frac{F_P}{\Delta f}\right).$$

In another embodiment, the mapping may employ a "ceiling" function, wherein ceiling(x) = the smallest integer no less than x. Another possibility is the closest subcarrier, those of skill in the art may readily devise other functions to uniquely map $F_P$ to $f_{SC0}$.

In this embodiment, the universal subcarrier grid given by the frequencies is defined from 0 Hz ($F_{offset} = 0$ Hz, $u_S = 0$) up to any given frequency. The raster can then be common to all RF carriers in all operating bands for a given subcarrier spacing $\Delta f$. If different subcarrier spacings are possible in a system, each subcarrier spacing can have its own subcarrier grid, thereby giving multiple overlapping subcarrier grids.

Figure 5:
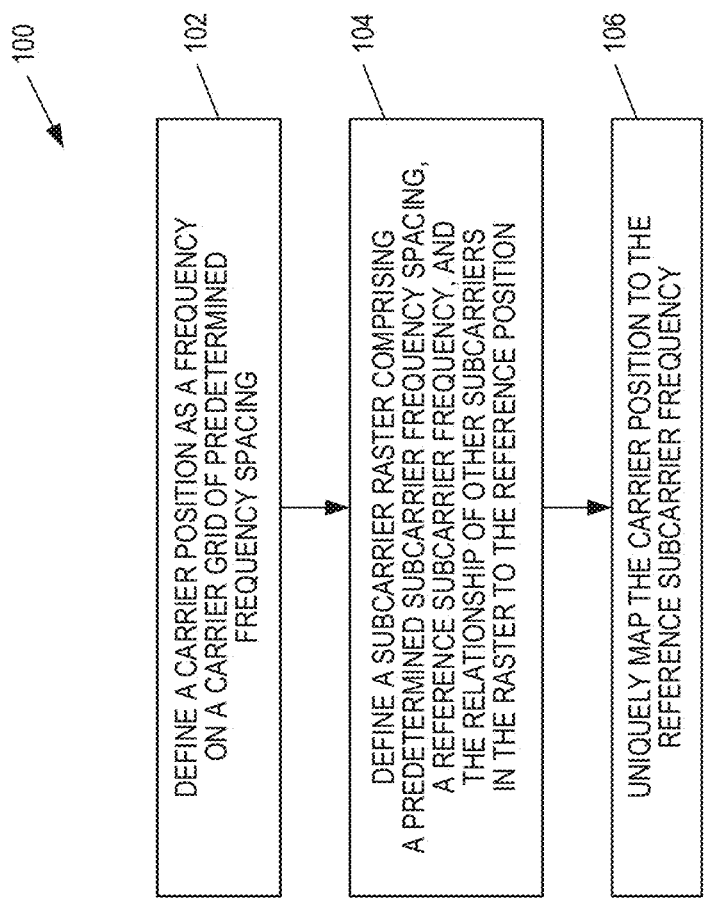
FIG. 5 is a flow diagram of a method of defining a component carrier in a wireless communication network.

FIG. 5 depicts a method 100 of defining a component carrier in a wireless communication network. A carrier position $F_P$ is defined as a frequency on a carrier raster of predetermined frequency spacing (block 102). The carrier position may not necessarily be the center frequency of a carrier. A subcarrier grid is defined (block 104). The carrier position $F_P$ is then uniquely mapped to the reference subcarrier frequency $f_{SC0}$ (block 106), which defines which subcarriers on the raster make up the RF carrier. This may be via a floor function, ceiling function, or the like. According to this method 100, the minimum distance between two component carrier positions is not limited to the least common multiple of carrier raster frequency spacing and subcarrier frequency spacing.

Figure 6:
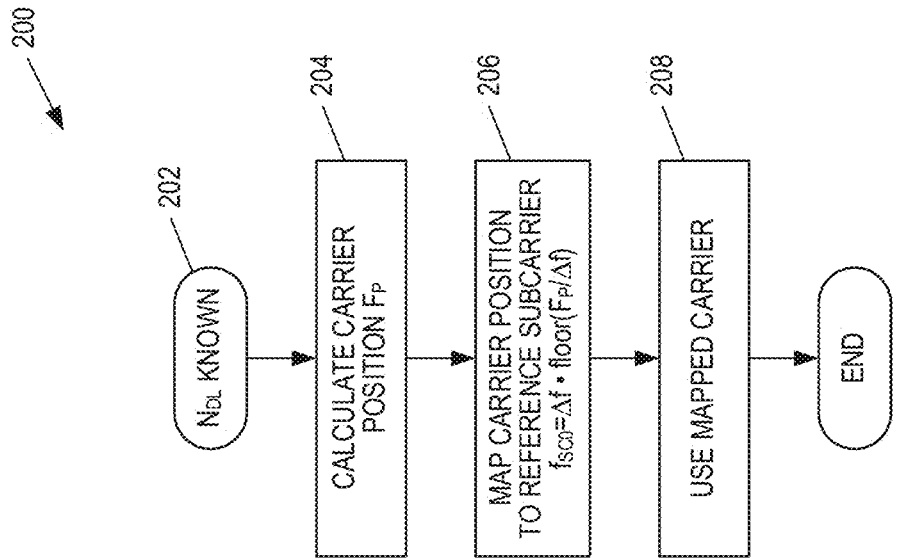
FIG. 6 is a flow diagram of a method of mapping a nominal carrier frequency to a reference subcarrier frequency and correspondingly defining an OFDM carrier that is aligned to the subcarrier frequency grid that contains the reference subcarrier frequency.

FIG. 6 depicts a method 200 of determining an RF carrier placement and mapping the carrier placement to a subcarrier grid. Assume a UE knows a frequency number $N_{DL}$ for a carrier (block 202). For example, in LTE, the UE or eNodeB may obtain the E-UTRA Absolute Radio Frequency Channel Number (EARFCN) from a system configuration of the eNodeB, where it is set to use a certain RF carrier frequency or frequencies on the carrier raster. A UE may receive the EARFCN from a signalling message, which may, for example, be part of a handover message. An eNodeB may alternatively utilize a channel access mechanism that hypothesises which RF carrier to use by attempting to use a carrier, taken from a set of possible RF carriers on the carrier raster, using a "Listen-before-talk" mechanism, or some other type of dynamic frequency selection, wherein the suitability of the carrier is first investigated by assessing the amount of interference received on the RF carrier frequency before an attempt to transmit is made.

Once $N_{DL}$ is known (block 202), by any of these mechanisms, the subcarriers to use for transmission and/or reception are identified through the method 200 depicted in FIG. 6. First, the nominal carrier frequency $F_P$ is calculated from the carrier number $N_{DL}$ (block 204). Then the nominal carrier frequency is mapped to the reference subcarrier frequency $f_{SC0}$ using a unique mapping, such as the floor function (block 206). The subcarrier frequency $f_{SC0}$ defines the position—e.g., the center or lower end of the carrier—and transmission and/or reception is carried out using subcarriers associated with the reference subcarrier frequency (block 208).

Figure 7:
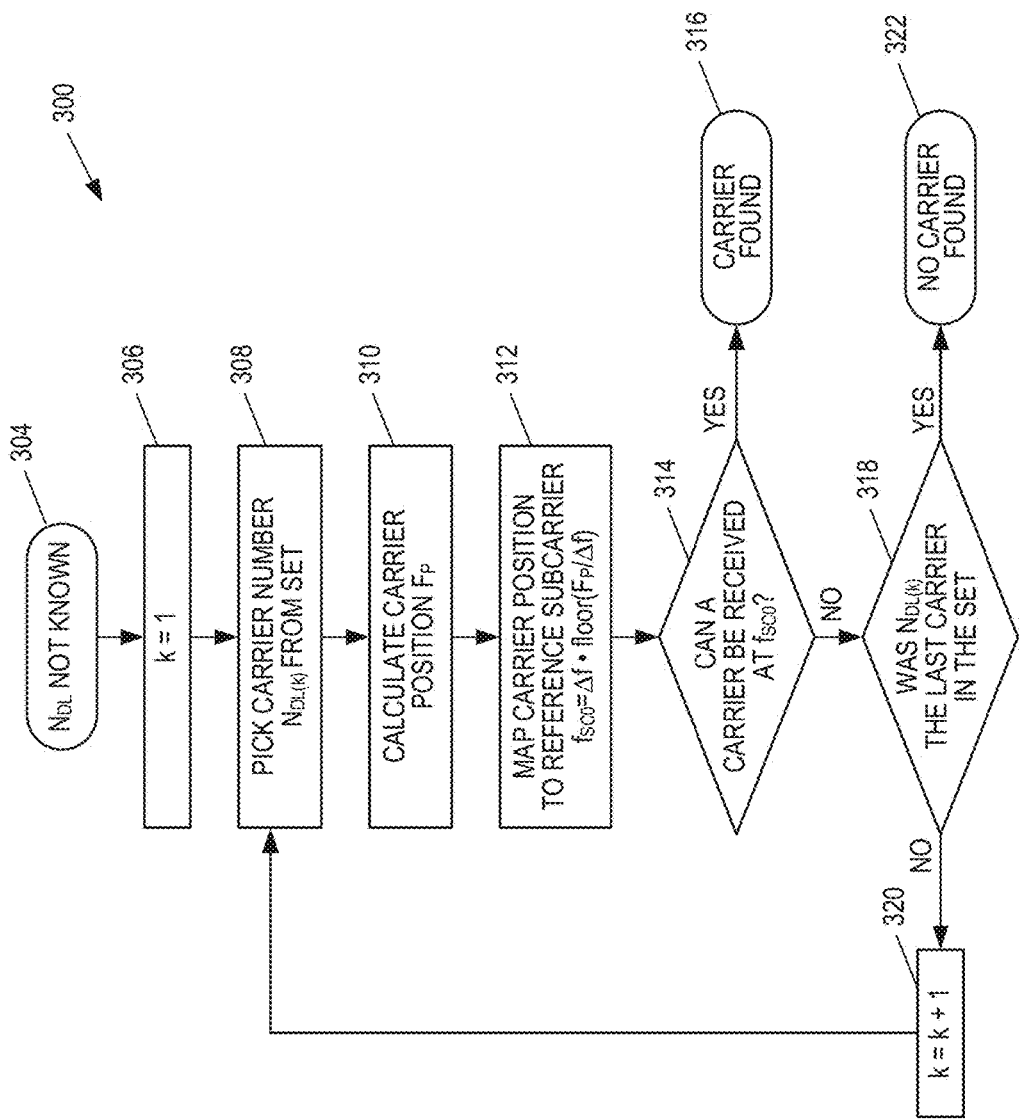
FIG. 7 is a flow diagram of a method of searching for an RF carrier when the frequency number is not known.

FIG. 7 depicts a method 300 of determining an RF carrier placement, and mapping the carrier placement to a subcarrier grid when the frequency number $N_{DL}$ is not known (block 304). Rather, the possible carrier numbers are in a known limited set $\{N_{DL(k)}\}$. This knowledge of the set of carriers may come from a pre-configured set of carriers to search for in a specific operating band, or signalling message received by a UE. This signalling message contains the possible carrier numbers $\{N_{DL(k)}\}$ to search for on the carrier raster. This may be a "neighbour cell list" that the UE is instructed to monitor. The UE will then hypothesize a possible RF carrier number and attempt to receive at that frequency. As depicted in FIG. 6, the UE loops through the set of carrier numbers $\{N_{DL(k)}\}$, starting with k=1 (block 306). For each carrier number $N_{DL(k)}$ selected from the set (block 308), the corresponding carrier position $F_P$ is calculated (block 310). This carrier position is mapped to the reference subcarrier frequency $f_{SC0}$ that identifies the RF carrier (block 312). The receiver then attempts to receive and synchronize to the RF carrier at the position identified by $f_{SC0}$ (block 314).

If the attempt to receive a carrier at $f_{SC0}$ is successful, carrier is found (block 316). If the attempt is not successful (block 314) and the carrier $N_{DL(k)}$ is not the last carrier in the set of carriers $\{N_{DL(k)}\}$ (block 318), k is increased (block 320) and the next carrier is selected from the set (block 308). In case $N_{DL(k)}$ is the last carrier in the set (block 318), the procedure is terminated without having found a carrier (block 322).

The subcarrier grid described in previous embodiments was defined from 0 Hz up to any given frequency. The raster would then be common to all RF carriers in all operating bands for a given subcarrier spacing $\Delta f$. In other embodiments, there can be multiple subcarrier grids defined. These can be specific to an operating band, to a group of bands, to sub-bands, to a group or groups of carriers, or any other defined subset of frequencies.

If there are multiple subcarrier grids, they may have the same or different subcarrier spacing $\Delta f$. Multiple rasters may also be separated or overlapping. In the case where subcarrier grids overlap, there has to be information available in each device specifying which subcarrier grid and spacing to apply when mapping the carrier position $F_P$ to a reference subcarrier frequency $f_{SC0}$. That information could be available as a look-up table, a system configuration, through signalling from a base station, or other means as known in the art.

Usually, there is only one carrier raster for the RF carriers, as described in the embodiment above. In another embodiment, there may be multiple RF carrier rasters and the grids may have different RF carrier spacing or starting frequencies ($F_{DL\_LOW}$) in different operating bands or other frequency ranges. There could also be different overlapping RF carrier rasters, where each grid is connected to a specific Radio Access Technology (RAT) or a set of RAT parameters, such as RF channel bandwidth, modulation, subcarrier spacing or RF carrier frequency.

In the previous embodiment, the reference subcarrier frequency $f_{SC0}$ identifies the DC subcarrier in the downlink carrier. In other embodiments, the reference subcarrier frequency identifies the center subcarrier in the uplink. If there is an even number of subcarriers, the reference subcarrier frequency $f_{SC0}$ can be between two subcarriers. Alternatively, any point uniquely defining the RF carrier placement on the subcarrier grid could be identified by the reference subcarrier frequency $f_{SC0}$, such as the highest subcarrier, the lowest subcarrier or any other well-defined point, which can serve as a reference point for the full RF carrier. The method of defining the reference point must consistently identify subcarriers on the same subcarrier grid so that any two RF carriers will have all their subcarriers on the same subcarrier grid. This is a condition for maintaining the orthogonality between two component RF carriers when aggregated.

In the embodiment above, the mapping function is a floor function. In other embodiments it can be the ceiling function, a rounding function (giving the closest integer, i.e. the closest subcarrier) or it could be any other unique mapping from a given carrier position $F_P$ to a unique point on the subcarrier grid.

Figure 8:
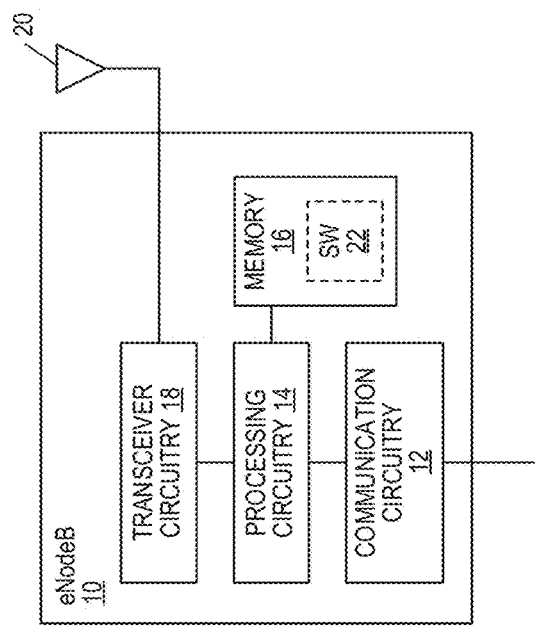
FIG. 8 is a functional block diagram of a node configured for operation as an eNodeB or other radio base station in a wireless communication network.

FIG. 8 depicts a network node 10 operative in embodiments of the present invention. In one embodiment, the node 10 implements base station functionality, such an eNodeB in LTE. The node 10 includes communication circuitry 12 operative to exchange data with other network nodes, along with processing circuitry 14 and associated memory 16. The associated memory 16 may be external to the processing circuitry 14, internal to the processing circuitry 14, or may comprise a mix of external and internal memory or storage devices. The network node 10 further includes radio circuits, such as transceiver circuitry 18, one or more antennas 20, and the like, to effect wireless communication across an air interface to one or more UEs. According to embodiments of the present invention, the memory 16 is operative to store, and the processing circuitry 14 operative to execute, software 22 which when executed is operative to cause the node 10 to select RF carrier positions, and map the carrier positions to a subcarrier grid, as described herein.

Thus, in an example implementation, the processing circuitry 14 is configured to map a nominal carrier frequency to a reference subcarrier frequency according to a mapping function. The nominal carrier frequency is among a plurality of nominal carrier frequencies defined by a carrier frequency raster that defines nominal carrier frequency positions within a frequency band of interest, and the mapping function uniquely maps each nominal carrier frequency to a corresponding reference subcarrier frequency on a subcarrier frequency grid that defines permissible subcarrier frequency positions within the frequency band. Correspondingly, the processing circuitry 14 is configured to define an OFDM carrier referenced to the reference subcarrier frequency and comprising a set of subcarriers at respective ones of the permissible subcarrier frequency positions, as defined by the subcarrier frequency grid, and to receive or transmit on the OFDM carrier. In some embodiments, the signals transmitted on the OFDM carrier are precoded. In at least one such embodiment, the precoding is done using a Discrete Fourier Transform, DFT, precoder.

Figure 9:
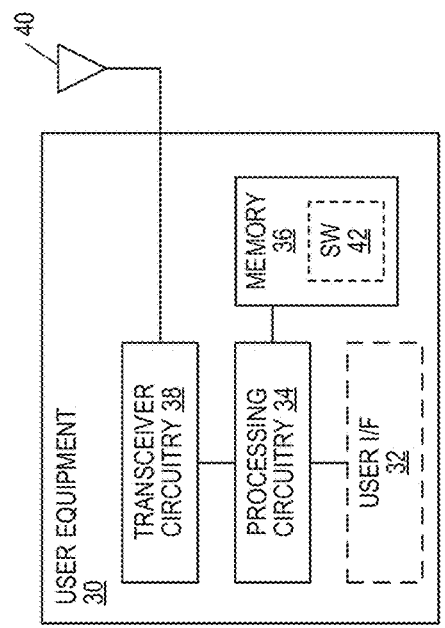
FIG. 9 is a functional block diagram of a node configured for operation as a UE or other wireless communication device in a wireless communication network.

FIG. 9 depicts a wireless device, such as but not limited to a UE 30, operative in embodiments of the present invention. As those of skill in the art are aware, a UE 30 is a device, which may be battery-powered and hence mobile, that is operative within a wireless communication network. In one or more embodiments, the UE 30 includes a user interface 32 (display, touchscreen, keyboard or keypad, microphone, speaker, and the like), in dependence on its features and intended use. However, in one or more other embodiments, the UE 30 omits the user interface 32.

The UE 30 further includes processing circuitry 34 and associated memory 36. The memory 36 may be external to the processing circuitry 34, internal to the processing circuitry 36, or may be a mix of internal and external memory. Still further, the UE 30 includes radio circuits, such as transceiver circuitry 38, one or more antennas 40, and the like, to effect wireless communication across an air interface to one or more nodes 10. The UE 30 may additionally include features such as a camera, removable memory interface, short-range communication interface (Wi-Fi. Bluetooth, and the like), wired interface (USB), battery recharge port, and the like (not shown in FIG. 9).

In at least some embodiments, the UE 30 is a Machine Type Communication (MTC) device and omits user interface circuitry and components, or implements only a very limited user interface. Broadly, it will be appreciated that the term "UE" as used herein encompasses essentially any type of wireless communication device and the particular implementation details of any given UE 30 will depend on its feature set and intended usage.

According to embodiments of the present invention, the memory 36 is operative to store, and the processing circuitry 34 operative to execute, software 42 which when executed is operative to cause the UE 30 to search for RF carriers, and map the carriers to a subcarrier grid, as described herein.

Thus, in an example implementation, the processing circuitry 34 is configured to map a nominal carrier frequency to a reference subcarrier frequency according to a mapping function. The nominal carrier frequency is among a plurality of nominal carrier frequencies defined by a carrier frequency raster that defines nominal carrier frequency positions within a frequency band of interest, and the mapping function uniquely maps each nominal carrier frequency to a corresponding reference subcarrier frequency on a subcarrier frequency grid that defines permissible subcarrier frequency positions within the frequency band. Correspondingly, the processing circuitry 34 is configured to define an OFDM carrier referenced to the reference subcarrier frequency and comprising a set of subcarriers at respective ones of the permissible subcarrier frequency positions, as defined by the subcarrier frequency grid, and to receive or transmit on the OFDM carrier.

The processing circuitry 14, 34 may comprise any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 16, 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM. PROM, EPROM, Flash memory, solid state disc, etc.), or the like.

The transceiver circuitry 18, 38 in one or more embodiments is configured for operation according to a defined air interface used by a Radio Access Network, such as IEEE 802.xx, CDMA, WCDMA, GSM, LTE, UTRAN, WiMax, or the like. The transceiver circuitry 18, 38 implements transmitter and receiver functionality appropriate to the Radio Access Network links (e.g., frequency allocations and the like). The transmitter and receiver functions may share circuit components and/or software, or alternatively, may be implemented separately.

The communication circuitry 12 may comprise a receiver and transmitter interface used to communicate with one or more other nodes over a communication network according to one or more communication protocols known in the art or that may be developed, such as Ethernet. TCP/IP, SONET, ATM, or the like. The communication circuitry 12 implements receiver and transmitter functionality appropriate to the communication network links (e.g., optical, electrical, and the like). The transmitter and receiver functions may share circuit components and/or software, or alternatively may be implemented separately.

Embodiments of the present invention present numerous advantages over prior art RF carrier and subcarrier array relationships. When multiple component carriers are combined for carrier aggregation, the carriers may be placed on any position on the carrier raster, and are not limited to positions that are both on a carrier raster and the subcarrier grid. The spacing between two component carriers (i.e. difference between carrier positions) can be chosen as any multiple of the RF carrier raster spacing, and is not restricted to the least common multiple of the carrier raster spacing and the subcarrier spacing. This means that the granularity of carrier spacing between carriers will be much better (i.e., the same as the carrier raster). This also minimizes the number of reserved subcarriers (unused spectrum) in the gap between RF carriers. When defining the characteristics for a new RAT, embodiments of the present invention provide much higher flexibility in choosing the RF parameters than prior art solutions. For example, it is possible to freely choose any subcarrier spacing, without aligning it in any way with the carrier raster, since the two parameters are independent.

Figure 10:
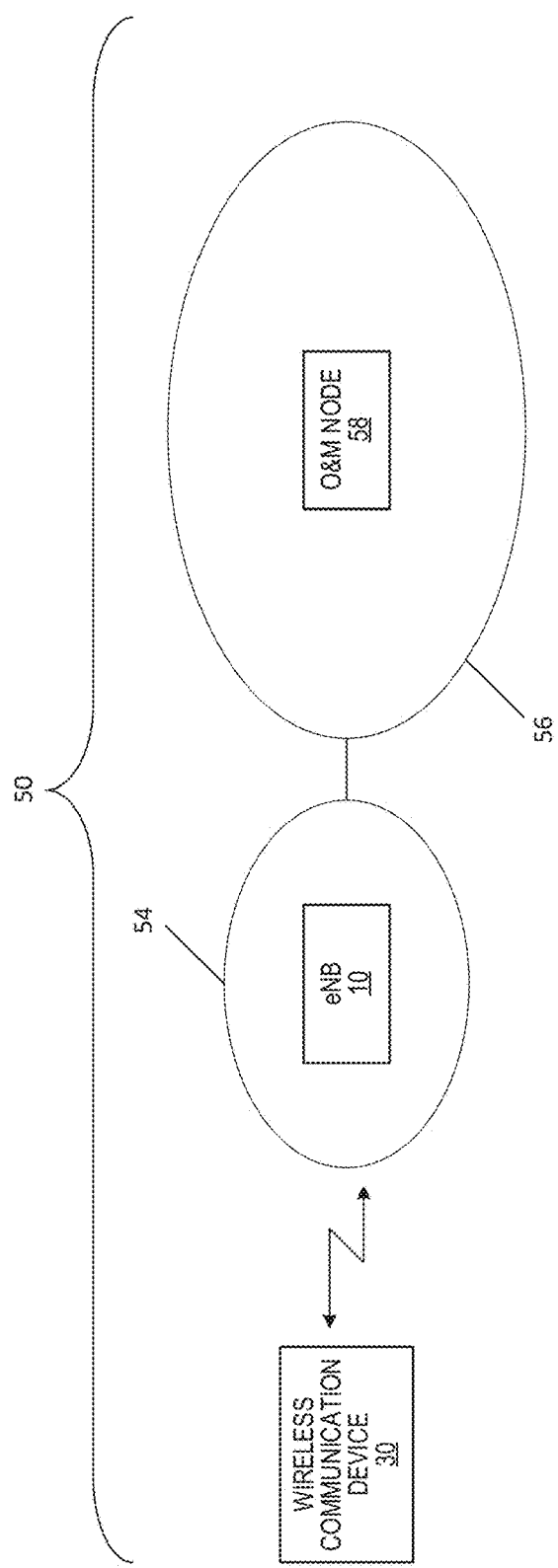
FIG. 10 is a functional block diagram of a wireless communication network, including a radio base station, e.g., an eNodeB according to FIG. 8, and a wireless communication device, e.g., a UE according to FIG. 9.

FIG. 10 illustrates an example wireless communication network 50, e.g., an LTE network or other 3GPP cellular communications network. The illustration is simplified to highlight items of interest, and one sees a Radio Access Network (RAN) 54 that includes one or more nodes 10 operating as radio base stations, e.g., eNodeBs in the LTE context. Further illustrated elements include a Core Network (CN) 56, which in the LTE context is referred to as the "Evolved Packet Corp" or EPC. While the CN 56 may include numerous nodes, such as packet gateways or other data-routing and control nodes, FIG. 10 illustrates an Operations and Maintenance (O&M) node 58 that is communicatively coupled directly or indirectly to the node 10 in the RAN 54.

FIG. 11 illustrates one embodiment of a method (220) of operation at a node 10 configured for operation as a radio base station in a wireless communication network 50. The method 220 includes the node 10 mapping (block 222) a nominal carrier frequency to a reference subcarrier frequency according to a mapping function. The nominal carrier frequency is among a plurality of nominal carrier frequencies defined by a carrier frequency raster that defines nominal carrier frequency positions within a frequency band of interest, and the mapping function uniquely maps each nominal carrier frequency to a corresponding reference subcarrier frequency on a subcarrier frequency grid that defines permissible subcarrier frequency positions within the frequency band.

The method 220 further includes defining (block 224) an Orthogonal Frequency Division Multiplex (OFDM) carrier referenced to the reference subcarrier frequency and comprising a set of subcarriers at respective ones of the permissible subcarrier frequency positions, as defined by the subcarrier frequency grid. Still further, the method 220 includes receiving or transmitting (block 226) on the OFDM carrier. As previously noted, in some embodiments, the signals transmitted on the OFDM carrier are precoded. In at least one such embodiment, the precoding is done using a Discrete Fourier Transform, DFT, precoder.

Consider how the method 220 contrasts with "conventional" approaches to defining OFDM carriers. First consider that an example OFDM carrier comprises a number of subcarriers having a fixed frequency spacing. Thus, the actual, absolute frequency positions of the subcarriers is determined by the center frequency or starting frequency of the OFDM carrier. Conventional approaches to defining an OFDM carrier include selecting the starting or center frequency and then fixing the subcarrier frequencies accordingly. In contrast, in the context of the method 220, the permissible subcarrier frequencies are already defined, and the node 10 shifts the nominal carrier frequency so that the subcarrier frequencies align with permissible subcarrier frequency positions.

In further aspects of defining (block 224) the OFDM carrier, the node 10 in at least some embodiments sets the number of subcarriers included in the set of subcarriers according to a configured bandwidth of the OFDM carrier. Here, and elsewhere, "defining" the OFDM carrier comprises configuring—in both logical and physical senses, e.g., RF tuning, etc.—the node 10 to operate with a set of subcarriers on the permissible subcarrier frequencies.

Defining (block 224) the OFDM carrier in one or more embodiments comprises logically organizing the set of subcarriers for receiving or transmitting, according to a predefined OFDM signal structure. Correspondingly, the mapping function may be configured to treat the nominal carrier frequency as being an approximate center frequency of the OFDM carrier and map to, as the reference subcarrier frequency, the subcarrier frequency in the subcarrier frequency grid that is closest to the nominal carrier frequency. Such processing further includes selecting subcarrier frequencies on either side of the reference subcarrier frequency according to the permissible subcarrier positions, as defined by the subcarrier frequency grid, for inclusion in the set of subcarriers comprising the OFDM carrier. Note that if the reference subcarrier frequency corresponds to the lower or upper end of the frequency span of the carrier, the selection of subcarrier frequencies will be directed to subcarriers above or below the reference subcarrier frequency.

Alternatively, the mapping function treats the nominal carrier frequency as an approximate center frequency of the OFDM carrier and maps to, as the reference subcarrier frequency, the subcarrier frequency in the subcarrier frequency grid that is immediately below or immediately above the nominal carrier frequency. As before, the method 220 further includes selecting subcarrier frequencies on either side of the reference subcarrier frequency according to the permissible subcarrier positions, as defined by the subcarrier frequency grid, for inclusion in the set of subcarriers comprising the OFDM carrier.

In at least one embodiment of the contemplated mapping, the nominal carrier frequency Fe is given by:

$$F_P = F_{DL\_LOW} + \Delta F \cdot (N_{DL} - N_{offset\_DL})$$

where $F_{DL\_LOW}$ is a starting point of the carrier frequency raster, $\Delta F$ is a grid spacing of the carrier frequency raster, $N_{DL}$ is a frequency number corresponding to the nominal carrier frequency $F_P$, and $N_{offset\_DL}$ is the frequency number of the starting point of the carrier frequency raster, wherein each subcarrier frequency $f_{SC}$ in the subcarrier frequency grid is given by:

$$f_{SC} = f_{offset} + \Delta f \cdot (u_{SC} - u_{offset}), \text{ and}$$

where $f_{offset}$ defines a starting point of the subcarrier frequency grid, $u_{offset}$ sets a subcarrier number of the starting point of the subcarrier frequency grid, $u_{SC}$ is the position number of the subcarrier frequency in the subcarrier frequency grid, and $\Delta f$ is a grid spacing of the subcarrier frequency grid. Accordingly, the defined mapping function is given by:

$$f_{SC0} = \Delta f \cdot \text{floor}\left(\frac{F_P}{\Delta f}\right)$$

where $f_{SC0}$ is the reference subcarrier frequency, $\Delta f$ is the subcarrier spacing, $F_P$ is the nominal carrier frequency, and floor(x)=the largest integer not greater than x.

Notably, such mapping operations may be carried out by the node 10 when configuring a downlink carrier for the node 10 to use for transmitting on the downlink, and when configuring an uplink carrier for the node 10 to use for receiving on the uplink. Further, a UE or other wireless communication device 30 may be configured to carry out the same mapping algorithm, for configuring itself to operate with a downlink carrier that has mapped in such a way by a base station, and when configuring itself to operate with an uplink carrier that is expected to be mapped in such a way. In other words, base stations and UEs can each implement the same kinds of mapping and carrier-definition algorithms, so that they perform complementary transmit and receive operations on subcarrier frequencies included in the defined set of permissible subcarrier frequency positions—see, e.g., Block 226 in FIG. 11.

Turning back to details of the method 220 depicted in FIG. 11, consider the case where the OFDM carrier is a downlink carrier. Here, the reference subcarrier frequency may be the "DC" subcarrier of the downlink carrier. Of course, the carrier may be defined or structured so as not to have a DC subcarrier. In any case, the method 220 includes transmitting signals on the downlink carrier to one or more wireless communication devices 30 operating in the wireless communication network 50.

In cases where the OFDM carrier is an uplink carrier, the reference subcarrier frequency is a center subcarrier of the uplink carrier. Here, the method 220 includes receiving signals transmitted on the uplink carrier by one or more wireless communication devices 30 operating in the wireless communication network 50.

In at least one embodiment, the OFDM carrier comprises a first OFDM carrier, and the method 220 includes defining one or more further OFDM carriers, based on mapping one or more further nominal carrier frequencies to respective reference subcarrier frequencies in the subcarrier frequency grid, as determined by the mapping function, such that the first and one or more further OFDM carriers are aligned on the subcarrier frequency grid. In such embodiments, the method 220 further includes using the first and one or more further OFDM carriers as aggregated OFDM carriers, according to a carrier aggregation configuration. In more detail, in at least one embodiment, the method 220 includes the node 10 selecting the nominal carrier frequency as one among two or more nominal carrier frequencies to be used for carrier aggregation, based on carrier-to-carrier spacings that are multiples of a subcarrier frequency spacing used to define the subcarrier frequency grid, defining the OFDM carrier as one among two or more OFDM carriers defined on the subcarrier frequency grid according to the mapping function, and operating in a carrier aggregation configuration with respect to the two or more OFDM carriers.

Still further, the method 220 in one or more example embodiments includes the node 10 selecting the nominal carrier frequency based on receiving a carrier frequency assignment from another node in the wireless communication network 50. In at least one such embodiment the other node is an O&M node 58.

FIG. 12 illustrates a method 230 of operation performed by a wireless communication device 30 in a wireless communication network 50. The method 230 generally corresponds to, or mirrors, the method 220 carried out by the node 10 operating as a radio base station in the wireless communication network 50. The method 230 includes the device 30 mapping (block 232) a nominal carrier frequency to a reference subcarrier frequency according to a mapping function, the nominal carrier frequency among a plurality of nominal carrier frequencies defined by a carrier frequency raster that defines nominal carrier frequency positions within a frequency band of interest, and the mapping function uniquely mapping each nominal carrier frequency to a corresponding reference subcarrier frequency on a subcarrier frequency grid that defines permissible subcarrier frequency positions within the frequency band. The method 230 further includes defining (block 234) an Orthogonal Frequency Division Multiplex (OFDM) carrier referenced to the reference subcarrier frequency and comprising a set of subcarriers at respective ones of the permissible subcarrier frequency positions, as defined by the subcarrier frequency grid, and receiving or transmitting (block 236) on the OFDM carrier.

The wireless communication device 30 may perform the method 230 with respect to a downlink carrier on which it will receive signals, or with respect to an uplink carrier that it will use for transmitting to the node 10.

As a general proposition, the method 230 includes at least some of the variations, extensions, implementations, and refinements described above for the method 220. However, at least some aspects of the method 230 are specific to implementation at the wireless communication device 30. For example, where the OFDM carrier is a downlink carrier, the reference subcarrier frequency may be a DC subcarrier of the downlink carrier, and the method 230 includes the wireless communication device 30 receiving signals on the downlink carrier from a radio base station 10 operating in the wireless communication network 50. Where the OFDM carrier is an uplink carrier, the reference subcarrier frequency may be a center subcarrier of the uplink carrier, and the method 230 includes the wireless communication device 30 transmitting signals on the uplink carrier to a radio base station 10 operating in the wireless communication network 50.

In a further example, the method 230 includes selecting the nominal carrier frequency in conjunction with performing a cell search operation, and searching for cell synchronization signals at subcarrier frequencies known as a function of the reference subcarrier frequency to which the nominal carrier frequency was mapped and the permissible subcarrier frequency positions defined by the subcarrier frequency grid. This example can be understood as representing a case where the wireless communication device 30 knows or assumes that the node 10 will transmit on a downlink carrier that has been mapped and defined according to the method 220, such that the wireless communication device 30 knows which ones of the defined subcarrier frequency positions will be used by the downlink carrier/cell in question.

The present invention may, of course, be carried out in other ways than those specifically set forth herein without departing from essential characteristics of the invention. The present embodiments are to be considered in all respects as illustrative and not restrictive.

What is claimed is:

1. A method of operation performed by a radio base station operating in a wireless communication network, the method comprising:

mapping a nominal carrier frequency to a reference subcarrier frequency according to a mapping function, the nominal carrier frequency among a plurality of nominal carrier frequencies defined by a carrier frequency raster that defines nominal carrier frequency positions within a radio frequency band of interest, and the mapping function uniquely mapping each nominal carrier frequency to a corresponding reference subcarrier frequency on a subcarrier frequency grid that defines permissible subcarrier frequency positions within the radio frequency band;

defining an Orthogonal Frequency Division Multiplex (OFDM) carrier referenced to the reference subcarrier frequency and comprising a set of subcarriers at respective ones of the permissible subcarrier frequency positions, as defined by the subcarrier frequency grid; and receiving or transmitting on the OFDM carrier.

2. The method of claim 1, wherein defining the OFDM carrier further comprises setting the number of subcarriers included in the set of subcarriers according to a configured bandwidth of the OFDM carrier.

3. The method of claim 1, wherein, the OFDM carrier is a downlink carrier, the reference subcarrier frequency is a DC subcarrier of the downlink carrier, and the method includes transmitting signals on the downlink carrier to one or more wireless communication devices operating in the wireless communication network.

4. The method of claim 1, wherein, the OFDM carrier is an uplink carrier, the reference subcarrier frequency is a center subcarrier of the uplink carrier, and the method includes receiving signals transmitted on the uplink carrier by one or more wireless communication devices operating in the wireless communication network.

5. The method of claim 1, wherein the OFDM carrier comprises a first OFDM carrier, wherein the method includes defining one or more further OFDM carriers, based on mapping one or more further nominal carrier frequencies to respective reference subcarrier frequencies in the subcarrier frequency grid, as determined by the mapping function, such that the first and one or more further OFDM carriers are aligned on the subcarrier frequency grid, and wherein the method further includes using the first and one or more further OFDM carriers as aggregated OFDM carriers, according to a carrier aggregation configuration.

6. The method of claim 1, further comprising selecting the nominal carrier frequency based on receiving a carrier frequency assignment from another node in the wireless communication network.

7. The method of claim 1, wherein defining the OFDM carrier comprises logically organizing the set of subcarriers for receiving or transmitting, according to a predefined OFDM signal structure.

8. The method of claim 1, wherein the mapping function treats the nominal carrier frequency as an approximate center frequency of the OFDM carrier and maps to, as the reference subcarrier frequency, the subcarrier frequency in the subcarrier frequency grid that is closest to the nominal carrier frequency, and wherein the method includes selecting subcarrier frequencies on either side of the reference subcarrier frequency according to the permissible subcarrier positions, as defined by the subcarrier frequency grid, for inclusion in the set of subcarriers comprising the OFDM carrier.

9. The method of claim 1, wherein the mapping function treats the nominal carrier frequency as an approximate center frequency of the OFDM carrier and maps to, as the reference subcarrier frequency, the subcarrier frequency in the subcarrier frequency grid that is immediately below or immediately above the nominal carrier frequency, and wherein the method includes selecting subcarrier frequencies on either side of the reference subcarrier frequency according to the permissible subcarrier positions, as defined by the subcarrier frequency grid, for inclusion in the set of subcarriers comprising the OFDM carrier.

10. The method of claim 1, further comprising selecting the nominal carrier frequency as one among two or more nominal carrier frequencies to be used for carrier aggregation, based on carrier-to-carrier spacings that are multiples of a subcarrier frequency spacing used to define the subcarrier frequency grid, defining the OFDM carrier as one among two or more OFDM carriers defined on the subcarrier frequency grid according to the mapping function, and operating in a carrier aggregation configuration with respect to the two or more OFDM carriers.

11. The method of claim 1 wherein the nominal carrier frequency $F_P$ is given by:

$$F_P = F_{DL\_LOW} + \Delta F \cdot (N_{DL} - N_{offset\_DL})$$

where $F_{DL\_LOW}$ is a starting point of the carrier frequency raster, $\Delta F$ is a grid spacing of the carrier frequency raster, $N_{DL}$ is a frequency number corresponding to the nominal carrier frequency $F_P$, and $N_{offset\_DL}$ is the frequency number of the starting point of the carrier frequency raster;

wherein each subcarrier frequency $f_{SC}$ in the subcarrier frequency grid is given by:

$$f_{SC} = f_{offset} + \Delta f(u_{SC} - u_{offset})$$

where $f_{offset}$ defines a starting point of the subcarrier frequency grid, $u_{offset}$ sets a subcarrier number of the starting point of the subcarrier frequency grid, $u_{SC}$ is the position number of the subcarrier frequency in the subcarrier frequency grid, and $\Delta f$ is a grid spacing of the subcarrier frequency grid; and wherein the defined mapping function is given by:

$$f_{SC0} = \Delta f \cdot \text{floor}\left(\frac{F_P}{\Delta f}\right)$$

where $f_{SC0}$ is the reference subcarrier frequency;
$\Delta f$ is the subcarrier spacing;
$F_p$ is the nominal carrier frequency; and
floor(x)=the largest integer not greater than x.

12. The method of claim 1, wherein signals transmitted on the OFDM carrier are precoded.

13. The method of claim 12, wherein the precoding is done using a Discrete Fourier Transform (DFT) precoder.

14. A method of operation performed by a wireless communication device in a wireless communication network, the method comprising:
mapping a nominal carrier frequency to a reference subcarrier frequency according to a mapping function, the nominal carrier frequency among a plurality of nominal carrier frequencies defined by a carrier frequency raster that defines nominal carrier frequency positions within a radio frequency band of interest, and the mapping function uniquely mapping each nominal carrier frequency to a corresponding reference subcarrier frequency on a subcarrier frequency grid that defines permissible subcarrier frequency positions within the radio frequency band;
defining an Orthogonal Frequency Division Multiplex (OFDM) carrier referenced to the reference subcarrier frequency and comprising a set of subcarriers at respective ones of the permissible subcarrier frequency positions, as defined by the subcarrier frequency grid; and
receiving or transmitting on the OFDM carrier.

15. The method of claim 14, wherein defining the OFDM carrier further comprises setting the number of subcarriers included in the set of subcarriers according to a configured bandwidth of the OFDM carrier.

16. The method of claim 14, wherein the OFDM carrier is a downlink carrier, the reference subcarrier frequency is a DC subcarrier of the downlink carrier and the method includes receiving signals on the downlink carrier from a radio base station operating in the wireless communication network.

17. The method of claim 14, wherein the OFDM carrier is an uplink carrier, the reference subcarrier frequency is a center subcarrier of the uplink carrier and the method includes transmitting signals on the uplink carrier to a radio base station operating in the wireless communication network.

18. The method of claim 14, wherein the OFDM carrier comprises a first OFDM carrier, wherein the method includes defining one or more further OFDM carriers, based on mapping one or more further nominal carrier frequencies to respective reference subcarrier frequencies in the subcarrier frequency grid, as determined by the mapping function, such that the first and one or more further OFDM carriers are aligned on the subcarrier frequency grid, and wherein the method further includes using the first and one or more further OFDM carriers as aggregated OFDM carriers, according to a carrier aggregation configuration.

19. The method of claim 14, wherein the method includes selecting the nominal carrier frequency in conjunction with performing a cell search operation, and searching for cell synchronization signals at subcarrier frequencies known as a function of the reference subcarrier frequency to which the nominal carrier frequency was mapped and the permissible subcarrier frequency positions defined by the subcarrier frequency grid.

20. The method of claim 14, wherein defining the OFDM carrier comprises logically organizing the set of subcarriers for receiving or transmitting, according to a predefined OFDM signal structure.

21. The method of claim 14, wherein the mapping function treats the nominal carrier frequency as an approximate center frequency of the OFDM carrier and maps to, as the reference subcarrier frequency, the subcarrier frequency in the subcarrier frequency grid that is closest to the nominal carrier frequency, and wherein the method includes selecting subcarrier frequencies according to the permissible subcarrier positions, as defined by the subcarrier frequency grid, on either side of the reference subcarrier frequency, for inclusion in the set of subcarriers comprising the OFDM carrier.

22. The method of claim 14, wherein the mapping function treats the nominal carrier frequency as an approximate center frequency of the OFDM carrier and maps to, as the reference subcarrier frequency, the subcarrier frequency in the subcarrier frequency grid that is immediately below or immediately above the nominal carrier frequency, and wherein the method includes selecting subcarrier frequencies according to the permissible subcarrier positions, as defined by the subcarrier frequency grid, on either side of the reference subcarrier frequency, for inclusion in the set of subcarriers comprising the OFDM carrier.

23. The method of claim 14, further comprising selecting the nominal carrier frequency as one among two or more nominal carrier frequencies to be used for carrier aggregation, based on carrier-to-carrier spacings that are multiples of a subcarrier frequency spacing used to define the subcarrier frequency grid, defining the OFDM carrier as one among two or more OFDM carriers defined on the subcarrier frequency grid according to the mapping function, and operating in a carrier aggregation configuration with respect to the two or more OFDM carriers.

24. The method of claim 14 wherein the nominal carrier frequency $F_P$ is given by:

$$F_P = F_{DL\_LOW} + \Delta F \cdot (N_{DL} - N_{offset\_DL})$$

where $F_{DL\_LOW}$ is a starting point of the carrier frequency raster, $\Delta F$ is a grid spacing of the carrier frequency raster, $N_{DL}$ is a frequency number corresponding to the nominal carrier frequency $F_P$, and $N_{offset\_DL}$ is the frequency number of the starting point of the carrier frequency raster;

wherein each subcarrier frequency $f_{SC}$ in the subcarrier frequency grid is given by:

$$f_{SC} = f_{offset} + \Delta f (u_{SC} - u_{offset})$$

where $f_{offset}$ defines a starting point of the subcarrier frequency grid, $u_{offset}$ sets a subcarrier number of the starting point of the subcarrier frequency grid, $u_{SC}$ is the position number of the subcarrier frequency in the subcarrier frequency grid, and $\Delta f$ is a grid spacing of the subcarrier frequency grid; and wherein the defined mapping function is given by:

$$f_{SC0} = \Delta f \cdot \text{floor}\left(\frac{F_P}{\Delta f}\right)$$

where $f_{SC0}$ is the reference subcarrier frequency;
$\Delta f$ is the subcarrier spacing;
$F_p$ is the nominal carrier frequency; and
floor(x)=the largest integer not greater than x.

25. The method of claim 14, wherein signals transmitted on the OFDM carrier are precoded.

26. The method of claim 25, wherein the precoding is done using a Discrete Fourier Transform (DFT) precoder.

27. A radio base station configured for operation in a wireless communication network, the radio base station comprising:
transceiver circuitry; and
processing circuitry configured to:
map a nominal carrier frequency to a reference subcarrier frequency according to a mapping function, the nominal carrier frequency among a plurality of nominal carrier frequencies defined by a carrier frequency raster that defines nominal carrier frequency positions within a radio frequency band of interest, and the mapping function uniquely mapping each nominal carrier frequency to a corresponding reference subcarrier frequency on a subcarrier frequency grid that defines permissible subcarrier frequency positions within the radio frequency band;
define an Orthogonal Frequency Division Multiplex (OFDM) carrier referenced to the reference subcarrier frequency and comprising a set of subcarriers at respective ones of the permissible subcarrier frequency positions, as defined by the subcarrier frequency grid; and
receive or transmit on the OFDM carrier.

28. The radio base station of claim 27, wherein the OFDM carrier is a downlink carrier, the reference subcarrier frequency is a DC subcarrier of the downlink carrier, and wherein, via the transceiver circuitry, the processing circuitry is configured to transmit signals on the downlink carrier to one or more wireless communication devices operating in the wireless communication network.

29. The radio base station of claim 27, wherein the OFDM carrier is an uplink carrier, the reference subcarrier frequency is a center subcarrier of the uplink carrier, and wherein, via the transceiver circuitry, the processing circuitry is configured to receive signals transmitted on the uplink carrier by one or more wireless communication devices operating in the wireless communication network.

30. The radio base station of claim 25, wherein the OFDM carrier comprises a first OFDM carrier, wherein the processing circuitry is configured to define one or more further OFDM carriers, based on mapping one or more further nominal carrier frequencies to respective reference subcarrier frequencies in the subcarrier frequency grid, as determined by the mapping function, such that the first and one or more further OFDM carriers are aligned on the subcarrier frequency grid, and use the first and one or more further OFDM carriers as aggregated OFDM carriers, according to a carrier aggregation configuration.

31. The radio base station of claim 27 wherein the nominal carrier frequency $F_P$ is given by:

$$F_P = F_{DL\_LOW} + \Delta F \cdot (N_{DL} - N_{offset\_DL})$$

where $F_{DL\_LOW}$ is a starting point of the carrier frequency raster, $\Delta F$ is a grid spacing of the carrier frequency raster, $N_{DL}$ is a frequency number corresponding to the nominal carrier frequency $F_P$, and $N_{offset\_DL}$ is the frequency number of the starting point of the carrier frequency raster;

wherein each subcarrier frequency $f_{SC}$ in the subcarrier frequency grid is given by:

$$f_{SC} = f_{offset} + \Delta f (u_{SC} - u_{offset})$$

where $f_{offset}$ defines a starting point of the subcarrier frequency grid, $u_{offset}$ sets a subcarrier number of the starting point of the subcarrier frequency grid, $u_{SC}$ is the position number of the subcarrier frequency in the subcarrier frequency grid, and $\Delta f$ is a grid spacing of the subcarrier frequency grid; and wherein the defined mapping function is given by:

$$f_{SC0} = \Delta f \cdot \text{floor}\left(\frac{F_P}{\Delta f}\right)$$

where $f_{SC0}$ is the reference subcarrier frequency;
$\Delta f$ is the subcarrier spacing;
$F_p$ is the nominal carrier frequency; and
floor(x)=the largest integer not greater than x.

32. The radio base station of claim 27, wherein signals transmitted on the OFDM carrier are precoded.

33. The radio base station of claim 32, wherein the precoding is done using a Discrete Fourier Transform (DFT) precoder.

34. A wireless communication device configured for operation in a wireless communication network, the wireless communication device comprising:
transceiver circuitry; and
processing circuitry configured to:
map a nominal carrier frequency to a reference subcarrier frequency according to a mapping function, the nominal carrier frequency among a plurality of nominal carrier frequencies defined by a carrier frequency raster that defines nominal carrier frequency positions within a radio frequency band of interest, and the mapping function uniquely mapping each nominal carrier frequency to a corresponding reference subcarrier frequency on a subcarrier frequency grid that defines permissible subcarrier frequency positions within the radio frequency band;
define an Orthogonal Frequency Division Multiplex (OFDM) carrier referenced to the reference subcarrier frequency and comprising a set of subcarriers at respective ones of the permissible subcarrier frequency positions, as defined by the subcarrier frequency grid; and
receive or transmit on the OFDM carrier.

35. The wireless communication device of claim 34, wherein the OFDM carrier is a downlink carrier, the reference subcarrier frequency is a DC subcarrier of the downlink carrier, and wherein, via the transceiver circuitry, the processing circuitry is configured to receive signals on the downlink carrier, as transmitted by a radio base station operating in the wireless communication network.

36. The wireless communication device of claim 34, wherein the OFDM carrier is an uplink carrier, the reference subcarrier frequency is a center subcarrier of the uplink carrier, and wherein, via the transceiver circuitry, the processing circuitry is configured to transmit signals on the uplink carrier to a radio base station operating in the wireless communication network.

37. The wireless communication device of claim 34, wherein the OFDM carrier comprises a first OFDM carrier, wherein the processing circuitry is configured to define one or more further OFDM carriers, based on mapping one or more further nominal carrier frequencies to respective reference subcarrier frequencies in the subcarrier frequency grid, as determined by the mapping function, such that the first and one or more further OFDM carriers are aligned on the subcarrier frequency grid, and use the first and one or more further OFDM carriers as aggregated OFDM carriers, according to a carrier aggregation configuration.

38. The wireless communication device of claim 34 wherein the nominal carrier frequency $F_P$ is given by:

$$F_P = F_{DL\_LOW} + \Delta F \cdot (N_{DL} - N_{offset\_DL})$$

where $F_{DL\_LOW}$ is a starting point of the carrier frequency raster, $\Delta F$ is a grid spacing of the carrier frequency raster, $N_{DL}$ is a frequency number corresponding to the nominal carrier frequency $F_P$, and $N_{offset\_DL}$ is the frequency number of the starting point of the carrier frequency raster;

wherein each subcarrier frequency $f_{SC}$ in the subcarrier frequency grid is given by:

$$f_{SC} = f_{offset} + \Delta f (u_{SC} - u_{offset})$$

where $f_{offset}$ defines a starting point of the subcarrier frequency grid, $u_{offset}$ sets a subcarrier number of the starting point of the subcarrier frequency grid, $u_{SC}$ is the position number of the subcarrier frequency in the subcarrier frequency grid, and $\Delta f$ is a grid spacing of the subcarrier frequency grid; and wherein the defined mapping function is given by:

$$f_{SC0} = \Delta f \cdot \text{floor}\left(\frac{F_P}{\Delta f}\right)$$

where $f_{SC0}$ is the reference subcarrier frequency;
$\Delta f$ is the subcarrier spacing;
$F_p$ is the nominal carrier frequency; and
floor(x)=the largest integer not greater than x.

39. The wireless communication device of claim 34, wherein signals transmitted on the OFDM carrier are precoded.

40. The wireless communication device of claim 39, wherein the precoding is done using a Discrete Fourier Transform, DFT, precoder.

41. A non-transitory computer-readable medium storing a computer program comprising program instructions that, when executed by processing circuitry in a radio base station that is configured for operation in a wireless communication network, cause the radio base station to:
map a nominal carrier frequency to a reference subcarrier frequency according to a mapping function, the nominal carrier frequency among a plurality of nominal carrier frequencies defined by a carrier frequency raster that defines nominal carrier frequency positions within a radio frequency band of interest, and the mapping function uniquely mapping each nominal carrier frequency to a corresponding reference subcarrier frequency on a subcarrier frequency grid that defines permissible subcarrier frequency positions within the radio frequency band;

define an Orthogonal Frequency Division Multiplex (OFDM) carrier referenced to the reference subcarrier frequency and comprising a set of subcarriers at respective ones of the permissible subcarrier frequency positions, as defined by the subcarrier frequency grid; and receive or transmit on the OFDM carrier.

42. A non-transitory computer-readable medium storing a computer program comprising program instructions that, when executed by processing circuitry in a wireless communication device that is configured for operation in a wireless communication network, cause the wireless communication device to:

map a nominal carrier frequency to a reference subcarrier frequency according to a mapping function, the nominal carrier frequency among a plurality of nominal carrier frequencies defined by a carrier frequency raster that defines nominal carrier frequency positions within a radio frequency band of interest, and the mapping function uniquely mapping each nominal carrier frequency to a corresponding reference subcarrier frequency on a subcarrier frequency grid that defines permissible subcarrier frequency positions within the radio frequency band;

define an Orthogonal Frequency Division Multiplex (OFDM) carrier referenced to the reference subcarrier frequency and comprising a set of subcarriers at respective ones of the permissible subcarrier frequency positions, as defined by the subcarrier frequency grid; and receive or transmit on the OFDM carrier.

\* \* \* \* \*

UNITED STATES PATENT AND TRADEMARK OFFICE
CERTIFICATE OF CORRECTION

PATENT NO. : 10,516,510 B2
APPLICATION NO. : 15/316204
DATED : December 24, 2019
INVENTOR(S) : Skold et al.

It is certified that error appears in the above-identified patent and that said Letters Patent is hereby corrected as shown below:

In the Specification

In Column 1, Line 41, delete "synchmnize" and insert -- synchronize --, therefor.

In Column 2, Line 24, delete "am" and insert -- are --, therefor.

In Column 4, Line 29, delete "Fr" and insert -- $F_p$ --, therefor.

In Column 6, Line 6, delete "Fr" and insert -- $F_p$ --, therefor.

In Column 6, Line 58, delete "subcarrier," and insert -- subcarrier; --, therefor.

In Column 9, Line 47, delete "(Wi-Fi." and insert -- (Wi-Fi, --, therefor.

In Column 10, Line 28, delete "ROM." and insert -- ROM, --, therefor.

In Column 10, Line 44, delete "Ethernet." and insert -- Ethernet, --, therefor.

In Column 12, Line 29, delete "Fe" and insert -- $F_P$ --, therefor.

In the Claims

In Column 16, Line 29, in Claim 11, delete "$F_p$" and insert -- $F_P$ --, therefor.

In Column 18, Line 20, in Claim 24, delete "$F_p$" and insert -- $F_P$ --, therefor.

In Column 19, Line 35, in Claim 31, delete "$F_p$" and insert -- $F_P$ --, therefor.

In Column 20, Line 51, in Claim 38, delete "$F_p$" and insert -- $F_P$ --, therefor.

Signed and Sealed this
Nineteenth Day of May, 2020

Andrei Iancu
*Director of the United States Patent and Trademark Office*